United States Patent
Le et al.

Patent Number: 5,670,856
Date of Patent: Sep. 23, 1997

[54] FAULT TOLERANT CONTROLLER ARRANGEMENT FOR ELECTRIC MOTOR DRIVEN APPARATUS

[75] Inventors: Dong Tuan Le, Lakewood; Colin E. Huggett, Torrance, both of Calif.

[73] Assignee: AlliedSignal Inc., Morris Township, N.J.

[21] Appl. No.: 335,026

[22] Filed: Nov. 7, 1994

[51] Int. Cl.$^6$ ............................................. G05B 9/02
[52] U.S. Cl. .................... 318/564; 318/616; 318/565; 244/194; 244/76 R; 371/68.1
[58] Field of Search ................ 318/30–99, 560–646; 364/550–551.01, 138, 140, 424.03, 434, 187; 375/357, 350, 424.05; 244/76 R, 194; 188/266; 307/34, 43, 64, 66, 82, 87; 371/68

[56] References Cited

U.S. PATENT DOCUMENTS

| | | | |
|---|---|---|---|
| 3,593,092 | 7/1971 | Flippo | 318/564 |
| 3,679,156 | 7/1972 | Redmond, Jr. | |
| 3,679,956 | 7/1972 | Redmond | 318/564 |
| 3,708,735 | 1/1973 | Barltrop | |
| 3,735,228 | 5/1973 | Redmond | 318/564 |
| 4,094,481 | 6/1978 | DeWalt | 244/194 |
| 4,159,444 | 6/1979 | Bartlett et al. | 318/564 |
| 4,162,438 | 7/1979 | Osder | 318/564 |
| 4,209,734 | 6/1980 | Osder | 318/564 |
| 4,472,780 | 9/1984 | Chenoweth et al. | 364/434 |
| 4,598,890 | 7/1986 | Herzog et al. | 244/230 |
| 4,649,484 | 3/1987 | Herzog et al. | 364/424 |
| 4,821,203 | 4/1989 | Carlton et al. | 364/478 |
| 4,825,133 | 4/1989 | Tanuma et al. | 318/113 |
| 4,834,319 | 5/1989 | Ewy et al. | 244/75 R |
| 4,877,972 | 10/1989 | Sobhani et al. | 307/43 |
| 4,967,359 | 10/1990 | Sugasawa et al. | 364/424.05 |
| 5,010,285 | 4/1991 | Kawamura et al. | 318/569 |
| 5,013,989 | 5/1991 | Kurakake et al. | 318/625 |
| 5,034,890 | 7/1991 | Sugasawa et al. | 364/424.05 |
| 5,070,284 | 12/1991 | Patil et al. | 318/362 |
| 5,140,237 | 8/1992 | Sasaki et al. | 318/568.11 |
| 5,159,251 | 10/1992 | Sasaki et al. | 318/572 |
| 5,237,250 | 8/1993 | Zeile et al. | 318/562 |
| 5,241,250 | 8/1993 | Nagasawa et al. | 318/591 |
| 5,252,899 | 10/1993 | Kawamura et al. | 318/568.1 |
| 5,274,554 | 12/1993 | Takats et al. | 364/424.03 |
| 5,359,270 | 10/1994 | Kawamura et al. | 318/571 |
| 5,422,915 | 6/1995 | Byers et al. | 375/357 |
| 5,430,663 | 7/1995 | Judd et al. | 364/550 |
| 5,493,497 | 2/1996 | Buus | 364/434 |

FOREIGN PATENT DOCUMENTS

| | | |
|---|---|---|
| 0 178 819 | 4/1986 | European Pat. Off. |
| 0 404 223 | 12/1990 | European Pat. Off. |
| 2 427 643 | 12/1979 | France |
| 1 131 017 | 10/1968 | United Kingdom |
| 2 119 966 | 11/1983 | United Kingdom |

*Primary Examiner*—Paul Ip
*Attorney, Agent, or Firm*—John R. Rafter

[57] ABSTRACT

A fault tolerant controller arrangement for electric motor driven apparatus is implemented by a plurality of control channels, each of which includes a motor and associated drive circuitry. The implementation is such that the rating of each of the plurality of channels is reduced and all channels are operated such that the load is shared between all operating channels. The arrangement is such that all channels share the load dynamically and statically and that each channel in a system of n channels supplies $1/n$ of the required load driving force in the same direction.

12 Claims, 3 Drawing Sheets

FAULT TOLERANT CONTROLLER ARRANGEMENT FOR ELECTRIC MOTOR DRIVEN APPARATUS

BACKGROUND OF THE INVENTION

This invention relates generally to electro-mechanical actuators and, particularly, to a fault tolerant controller arrangement for actuators of the type described which are driven by electric motors.

Traditionally, aircraft control surfaces such as rudders, elevators, horizontal stabilizers and ailerons have been controlled by mechanical means. Most aircraft use multiple channel (redundant) arrangements for the purposes described to insure aircraft safety and mission success in the case of military aircraft.

In modern aircraft, the displacement of aircraft control surfaces involves an electrical actuator. That is to say, a microprocessor based electronic control unit sends command signals via conductors to an electric motor. The electric motor responds to the command signals by driving a suitable mechanism such as a linear ball screw or threaded actuator having a thrust rod linked to the control surface. For purposes of illustration, in an electro-hydraulic actuating arrangement the electric motor drives a pump that directs hydraulic fluid into a hydraulic actuator. This combination of electrical and mechanical components is known as a "fly-by-wire" control surface actuating system.

It will be appreciated that fly-by-wire systems offer significant advantages over traditional actuating systems. For example, a reduction in weight is realized. Also, large mechanical, pneumatic or hydraulic linkages are replaced with electrical wires. Overall, the cost of operating an aircraft with a fly-by-wire actuating system is greatly reduced.

Although fly-by-wire actuating systems are recognized as being advantageous for the purposes aforenoted, there exists a need for fault tolerance in such systems, particularly when a primary flight control surface is being actuated. It will be appreciated that if a conductor breaks, a motor fails or the actuating system otherwise malfunctions, control of the flight surface will be lost, which could lead to catastrophic results.

Fault tolerance can be achieved in a variety of ways. For actuating systems with two channels per actuator, each actuator can be sized for the entire load so that failure of one channel causes transfer of control to the second channel. An arrangement of this type is known as a single fault tolerant system. Where more than one failure is to be tolerated while still maintaining control of the aircraft surfaces, more channels are typically added. For example, three channels are often used. The arrangement is such that two channels can fail and the third channel is able to actuate the aircraft control surface with adequate performance. In such a multi-channel system, if each channel is rated for a full load, the size, weight and cost of each actuator can become prohibitive. The present invention provides an alternative for rating each channel of a multi-channel system for full load.

SUMMARY OF THE INVENTION

This invention contemplates a fault tolerant controller arrangement for electric motor driven apparatus wherein a plurality of control channels are implemented. The implementation is such that the rating of each of the plurality of channels is reduced and all channels are operated such that the load is shared between all operating channels. For example, if three channels are proposed, the rating of each channel would be one-half of the total load. The operating channels would have the combined capability of one and one-half times the required load with each channel supplying only one-third of full load. Upon failure of one channel, the remaining two channels would operate up to their full capacity (one-half of full load). A second channel failure would enable the third channel to safely operate the apparatus. The number of channels can be increased as required. For example, a four channel system could be sized such that each channel is rated one-half of full load and supplies full capability following the first two failures. Only on the third failure would reduced capability be realized.

An arrangement such as described requires that all channels share the load dynamically and statically and that each channel in a system of n channels supply $1/n$ of the required load driving force in the same direction. This insures that "force fight", i.e. individual channels providing up to their maximum force, but in summation with the other channels provide no resultant output force, does not occur.

Accordingly, one object of the present invention is to provide a fault tolerant controller arrangement for electric motor driven apparatus that insures that "force fight" does not occur.

Another object of this invention is to provide an arrangement of the type described that insures that each channel of an n channel system supplies only $1/n$ of the full load requirement.

Still another object of this invention is to provide an arrangement of the type described which enables certain faults to be tolerated without losing any channel of an n channel system, effectively "masking" the fault.

Yet another object of this invention to provide an arrangement of the type described which provides continuous rated performance in the presence of "non-maskable" failures in individual channels.

DETAILED DESCRIPTION OF THE INVENTION

Figure 1:
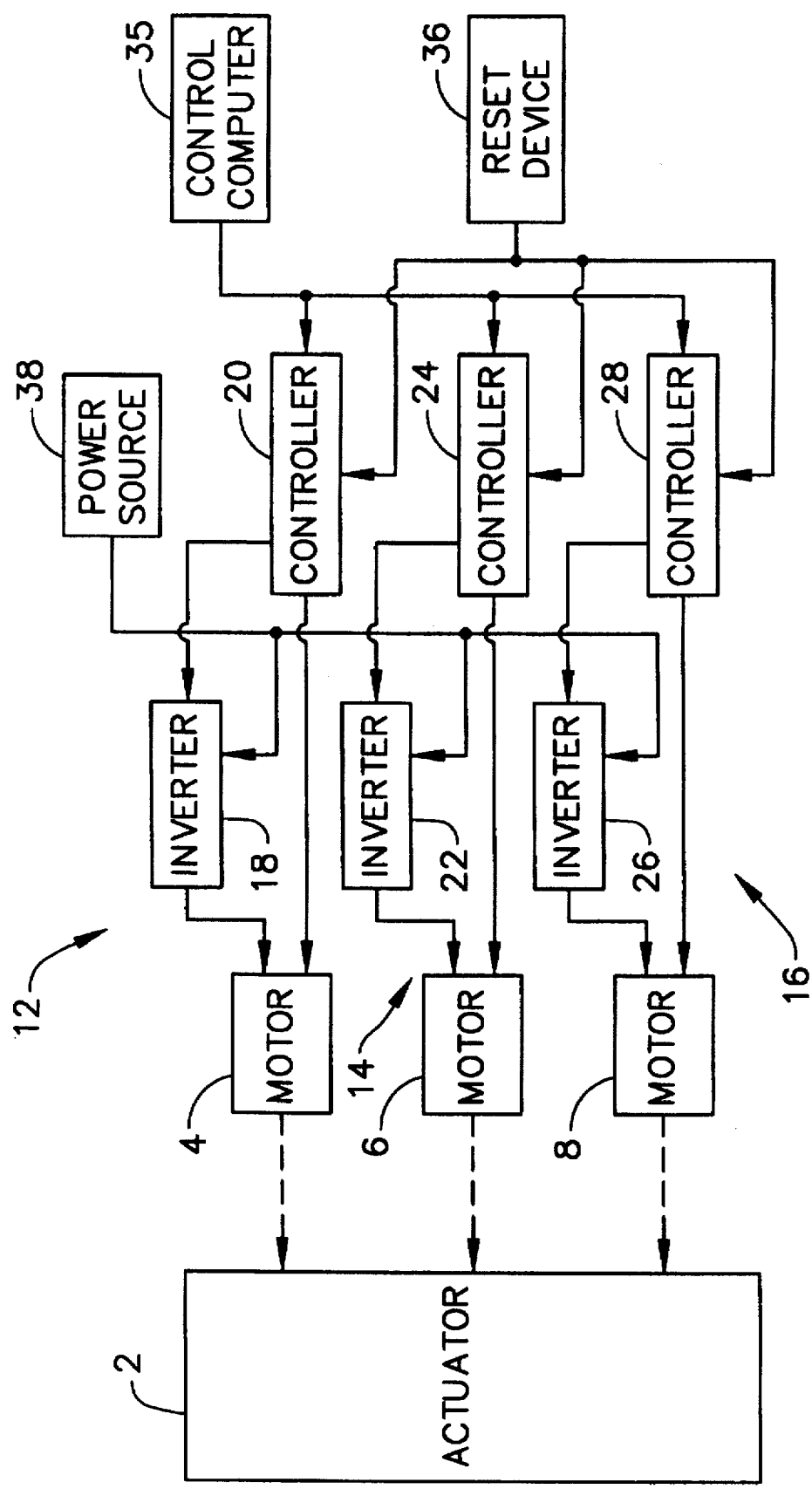
FIG. 1 is a block diagram of a fault tolerant controller arrangement for electric motor driven apparatus in accordance with the invention.

FIG. 1 shows, for purposes of illustration an actuator system that is tolerant to two faults. The system includes an actuator 2 which is driven by three electric motors 4, 6 and 8. Any one of the motors 4, 6 and 8 could drive actuator 2, or any combination of motors could simultaneously drive the actuator on a share-the-load basis. Actuator 2 may be an electrohydraulic actuator or an electromechanical actuator including, for example, a linear ballscrew. For a linear ballscrew actuator motors 4, 6 and 8 drive a ballscrew nut. Rotation of the ballscrew nut causes a leadscrew to move axially to drive a load. For an electrohydraulic actuator, motors 4, 6 and 8 control the position of valve plates to regulate the amount of fluid entering a cylinder. Electrohydraulic and electromagnetic actuators for the purposes described are well known in the art and will not be further described herein.

Motors 4, 6 and 8 may be three-phase torque motors or stepper motors. Motors of the type described are also well known in the art and will likewise not be further described herein.

Actuator 2 is controlled by a fault tolerant actuating system which includes three channels 12, 14, and 16 which control motors 4, 6 and 8, respectively. Channel 12 includes motor 4, an inverter 18 and a controller 20; channel 14 includes motor 6, an inverter 22 and a controller 24; and channel 16 includes motor 8, an inverter 26 and a controller 28. The inverters chop up dc power to energize selected phase windings of the respective motors.

Figure 2:
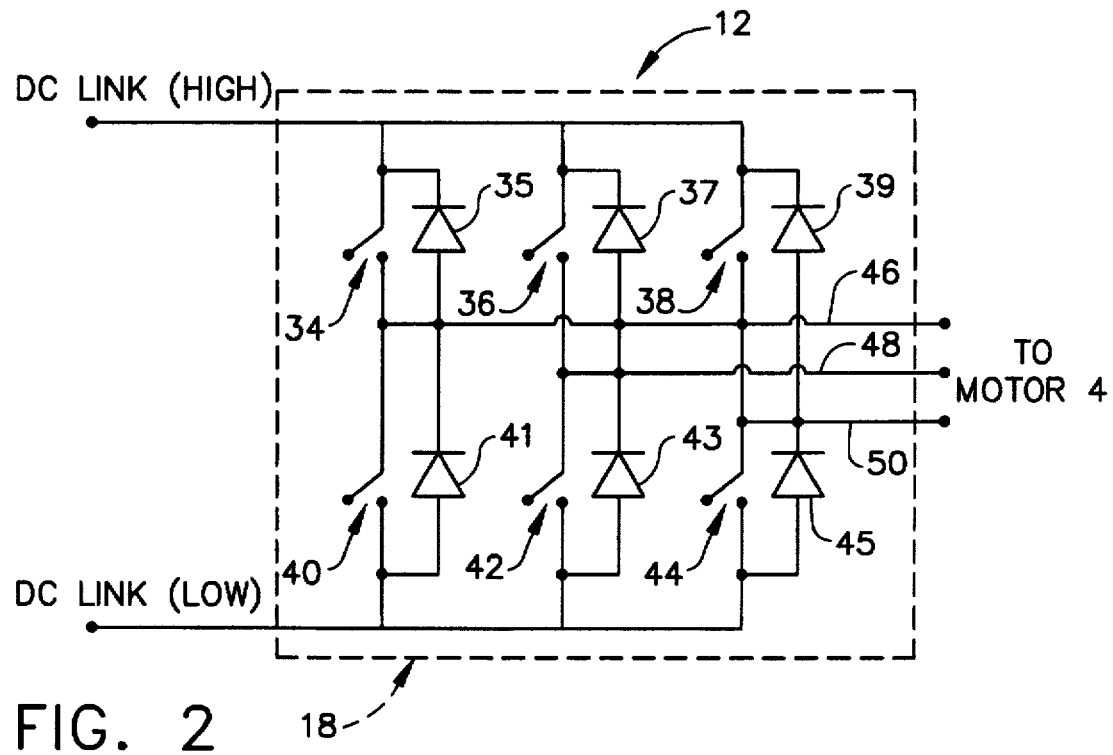
FIG. 2 is a circuit diagram of a typical inverter of the type included in the arrangement shown in FIG. 1.

A typical inverter such as 18 in channel 12 is shown in FIG. 2 and includes six switches, i.e., three switches 34, 36 and 38 and three complimentary switches 40, 42 and 44. High sides of switches 34, 36 and 38 are connected via diodes 35, 37 and 39, respectively, to dc link (high), and low sides of lower switches 40, 42, and 44 are connected via diodes 41, 43 and 44 to a dc link (low). The low sides of switches 34, 36, 38 and the high sides of complementary switches 40, 42, 44 are connected to associated phase windings 46, 48 and 50, respectively, of motor 4 as shown in FIG. 2. Turning the switches on and off controls the direction and amount of current flowing through selected motor windings.

Switches 34-44 can be insulated bipolar transistors (IGBT's); power MOS FET's; MOS-control thyistors (MCT's); or other power switches known to those skilled in the art.

Switches 34-44 are turned on and off in response to commutation commands, which are generated by associated controller 20. The amount of current flowing through the motor windings is proportional to the on-time of the switches. The torque delivered by motor 4, in turn, is proportional to the amount of current flowing through the windings. Although inverter 18 has been described for purposes of illustration, it will be appreciated that inverters 22 and 26 are constructed like inverter 18 and operate in a like manner.

To insure that all active controllers 20, 24 and 28 supply the identical current commands to their respective motors 4, 6 and 8, respectively, the controllers exchange data over a data bus. Each controller then votes on data at the individual channel level. This enables all three controllers to process the same command and feedback signals, thereby masking any fault variables and providing appropriate commands to the respective inverters 18, 22 and 26. This exchange of data provides a uniform current command for each motor 4, 6 and 8. A uniform torque is thus delivered by each motor and hence force-fight between the motors is prevented and the load to the motors is balanced. If a particular motor 4, 6 or 8, or its associated channel 12, 14 or 16, fails, the load is distributed among the remaining motors.

Controllers 20, 24 and 28 receive commands, such as, for example, position commands, from a control computer 35. A system reset device 36 is actuated to reset the controllers. DC power is supplied to inverters 18, 22, and 26 by a power source 38.

Figure 3:
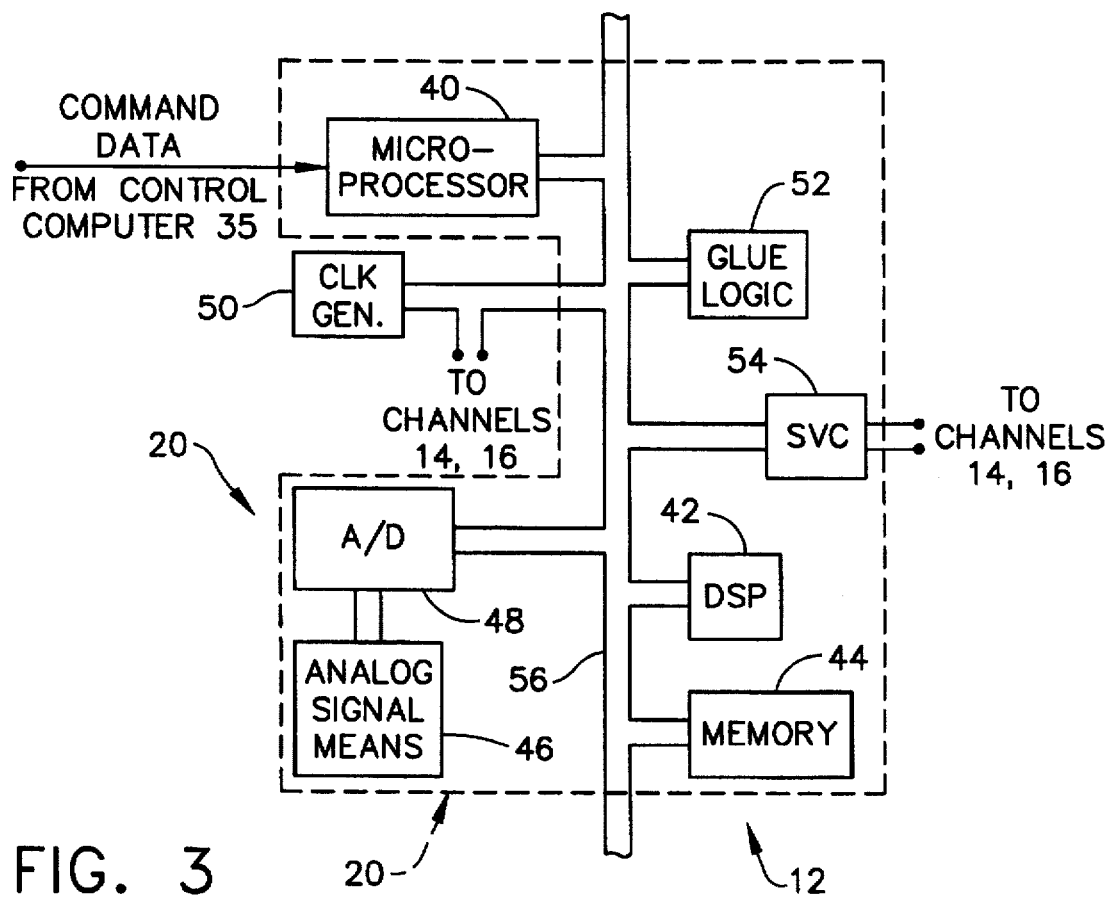
FIG. 3 is a block diagram of a typical controller of the type included in the arrangement shown in FIG. 1.

FIG. 3 shows a typical controller such as, for purposes of illustration, controller 20 in channel 12. Controller 20 includes a general purpose microprocessor 40, a digital signal processor (DSP) 42, memory 44, analog signal means 46, an analog to digital converter (A/D) 48, glue logic 52 and a synchronizer and voter device (SVC) 54, all of which are connected via a bus 56.

The arrangement is such that analog feedback signals (motor position, speed) from analog signal means 46 are converted to digital signals by A/D converter 48. The digital signals are applied to DSP 42. Command data from control computer 34 (FIG. 1) is applied to microprocessor 40 which processes the data and performs general housekeeping duties.

Microprocessor 40 applies the processed data to DSP 42 via memory 46. DSP 42 determines motor, position and speed; motor current amplitude and direction; closes the loop on current, speed and position; and generates the aforementioned commutation commands. A typical DSP for purposes of the present invention may be of the type marketed by Analog Devices Corporation under their trade designation ADSP 2100. Although controller 20 is illustrated and described, it will be appreciated that controllers 24 and 28 are constructed like controller 20 and operate in a like manner and are interchangeable.

Direct digital control utilizing digital signal processors and controller components in the form of monoliths integrated chips as contemplated by the present invention reduces the overall parts count by more than an order of magnitude compared to discrete analog/combinational arrangements traditionally employed for such applications, thereby improving reliability while reducing cost, as will be recognized as advantages.

The control of inverters 18, 22 and 25 by respective controllers 20, 24, and 28 requires that data be exchanged between channels 12, 14 and 16 to insure that each channel receives identical data for determining motor current (torque) commands. Exchanged data is listed in Table A below.

TABLE A 1. position control
2. position feedback
3. speed command
4. speed feedback
5. current command
6. current feedback
7. channel status To insure that above data is identical in real time, all inverter channels such as 12, 14 and 16 are synchronized via a clock generator 50 such that frame update is controlled to a rate of approximately 1 KHz. This synchronization insures that all channels receive identical data so that identical current commands can be generated. Frame update of one millisecond is adequate to meet the frequency response of most position and speed servos.

Transmission between a particular one of the controllers such as 20, 24 or 28 and the other controllers is synchronize by SVC 54 as illustrated in FIG. 3. It is possible to interface SVC 54 with microprocessor 40 or DSP 42. However, maximum fault-tolerance is achieved, and the quantity of data that has to be transferred will be minimized, when SVC 54 interfaces with DSP 42. Furthermore, DSP 42 can function adequately when microprocessor 40 fails because the DSP will still receive identical commands and feedbacks from the other channels.

With the arrangement shown, motor stator current, rotor position and rotor speed are samples once every 20 microseconds. Data is then exchanged through SVC 54. This gives sufficient time to close the current loop every 100 microseconds, allowing for a torque-loop frequency response that is greater than 1K Hz. This response is sufficient for most applications.

Data must be made available to the other channels at a rate that is sufficient to enable loop closure with a crossover frequency compatible with actuator 2 requirements. For a loop to be hereinafter described with reference to FIG. 4, a 10:1 sample rate requires a data exchange of at least 500 times per second. A maximum sample rate would be approximately 1000 times per second. A crossover frequency in excess of 2000 Hz has been demonstrated to be adequate for control of motors 4, 6 and 8 when the motors are of the permanent magnet type, as contemplated by the present invention.

Figure 4:
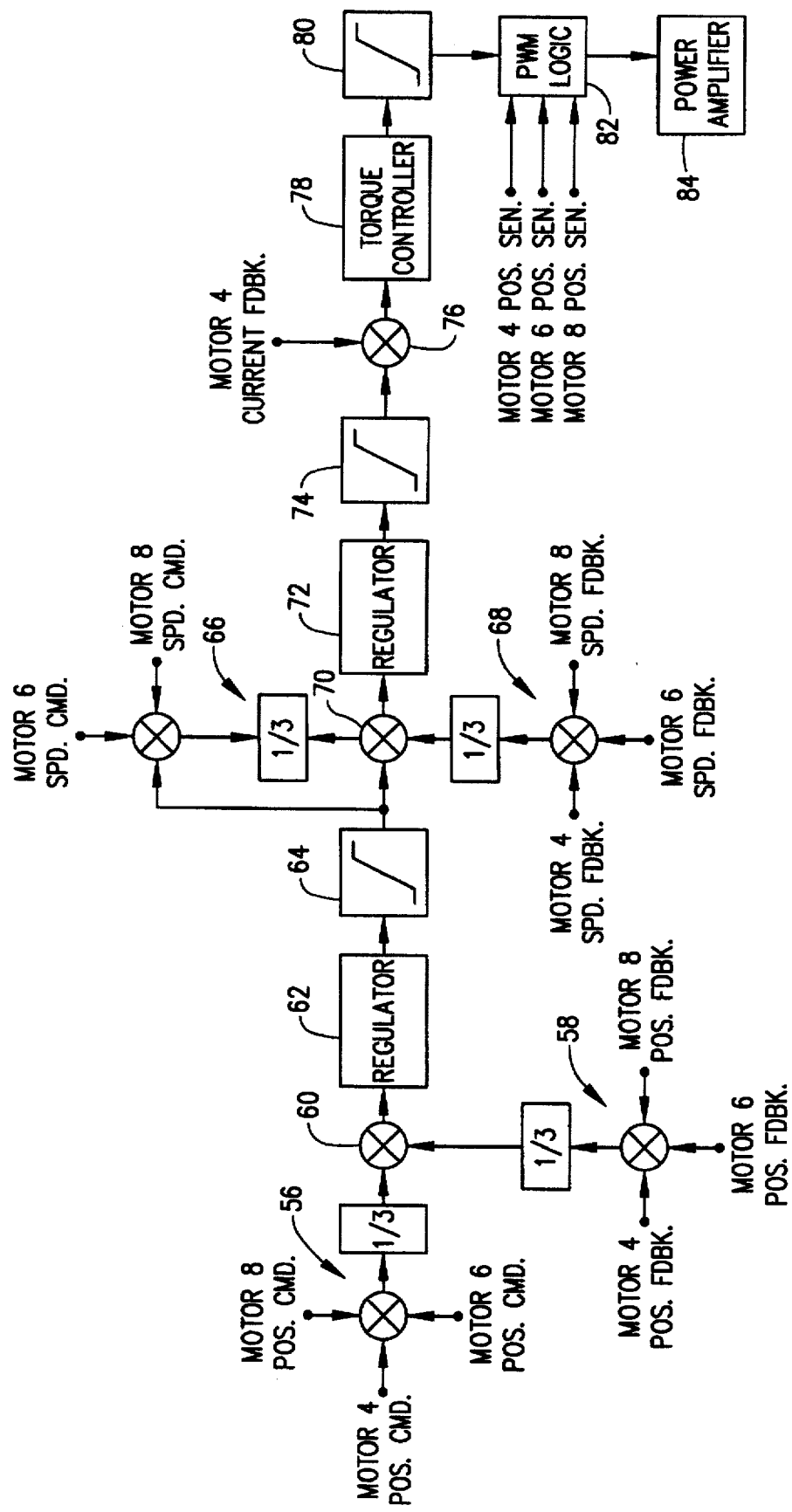
FIG. 4 is a logic/block diagram of a digital signal processor of the type included in the arrangement shown in FIG. 1.

FIG. 4 illustrates the control logic for closing the loop surrounding the current loop. The control logic includes an inner current loop, and a position loop surrounding the speed loop. A DSP such as 42 in each channel 14, 16 and 18 takes the average of the signals for all active controllers 20, 24 and 28 and uses the averages in a closed loop control. This insures that the current commands from all controllers are identical.

In the position loop, an average of all three position commands for motors 4, 6 and 8 is taken by a summing means 56, and an average of all three position feedback signals is taken by a summing means 58. A summing junction 50 provides a position error signal indicating the difference between the average position command and average position feedback signals. The position error signal is regulated by a regulator 62 to provide a speed command for, for example, motor 4. Overspeed is prevented by limiting the speed command via a limiter 64 as is desireable. The output from limiter 64 is provided to channels 14, 16 and 18.

In the speed loop, an average of all three speed commands is taken by a summing means 66, and an average of all three speed feedback signals is taken by summing means 68. A summing junction 70 generates an error signal indicating the difference between the average speed command and average speed feedback signals. The speed error signal is regulated by a regulator to provide a current command for one of the three motors 4, 6 8. The current command is limited by a limiter 74 to prevent overcurrent, as is desireable.

In the current loop, the current command provided by limiter 74 is compared to a current feedback signal from motor 4 at a summing junction 76. The resulting error signal is regulated by a torque controller 78 and limited by a limiter 80 to provide a pulse width modulation (PWM) command. This command is applied to PWM logic 82. PWM logic generates commutation commands for motors 4, 6 and 8 in response to this command and in response to motor 4, 6, 8 position sensors, and which commands are applied to a power amplifier 84 in the output stage of the arrangement.

Validity of the incoming data must be checked by the microprocessor such as 40 in each channel 14, 16 and 18 before being processed by the DSP such as 42 in each channel. Data received by the controllers must be identical, otherwise undesired force fight occurs as aforenoted. Whereas the incoming position commands should all be identical, the other data may not. The incoming data delivered to the microprocessor such as 40 is time synchronized at the output of control computer 34. Due to timing differences between channels, however, all of the control variables may not be updated at the identical time as the position commands received by the DSP such as 42.

The DSP's in each channel validate incoming data which is referred to as "voting." In a first step, each DSP issues a status word (7 in Table A) to the other controllers. This word aids in fault detection and isolation. An exemplary format for a 4-bit status word is shown in Table B below.

TABLE B

| ABCD | STATUS |
|---|---|
| 0001 | use only A, B, C |
| 0010 | use only A, B, D |
| 0011 | use only A, B |
| 0100 | use only A, C, D |
| 0101 | use only A, C |
| 0110 | use only A, D |
| 0111 | shutdown |
| 1000 | use only B, C, D |
| 1001 | use only B, C |
| 1010 | use only B, D |
| 1011 | shutdown |
| 1100 | use only C, D |
| 1101 | shutdown |
| 1110 | shutdown |
| 1111 | shutdown |

Thus, any combination of two or three controllers such as 20, 24 and 28 can be employed to control actuator 2. If only one controller is active, the control arrangement shuts down.

In a second step, the DSP's interrogate the status word to determine which of the other channels are active. Only the active channels vote on, and process, incoming data.

In a third step, the DSP's vote on the position command. It is contemplated that the synchronization between DSP's will be accomplished at ¼ of the update (sample) rate of 1000 Hz. Thus, the position command must be outputted to each channel every millisecond. When the position command is received, it may, therefore, contain data that differs on occasion (e.g., every Xth sample), even though a failure did not occur. Consequently, a vote of only the bit-for-bit identical data is performed, and all other data is ignored.

In a fourth step, the microprocessor such as 40 in each channel examines both speed and position feedback signals to determine if the error between these signals is excessive. If the error is greater that 10% of a predetermined nominal value, the two feedback signals that are constant will be utilized as the feedback, and averaged. It is possible that the error between channels will yield information on the overall status of the system and can be used to direct maintenance activity at an appropriate time.

If one of the feedback signals is eliminated by voting, due to excessive error, the average of the increasing signals will be used, thereby automatically compensating for loop gain.

There is thus disclosed an arrangement that will supply identical commands to a plurality of motors to balance the load distribution between said motors. It will function without loss of an actuator channel, even when data link management circuitry fails.

Although a three channel system (tolerant to two faults) has been illustrated and described, a system with more channels may be used as well, as will now be appreciated.

With the above description of the invention in mind, reference is made to the claims appended hereto for a definition of the scope of the invention.

What is claimed is:

1. A fault tolerant system for driving an actuator, comprising:
   a plurality of motors coupled to the actuator for driving said actuator;
   a corresponding plurality of control channels, each of which is connected to a respective motor for driving said respective motor;
   each of said control channels including controller means connected to a respective motor and receiving data therefrom; and said controller means at each motor for voting on the data at the individual channel level with each of said controller means being effective for controlling a respective channel of the plurality of channels so that each of said plurality of channels shares the load required for driving the actuator, with each of said channels in a system of n channels supplying 1/n of a required load driving force in the same direction even in the event of channel failure.

2. The system as described by claim 1, wherein each of said controller means includes:

inverter means connected to a respective motor and to a respective controller means and including switching means; and the switching means being rendered on and off in response to commands from said respective controller means, with the amount of current passing through windings of the respective motors, and hence the torque delivered by said respective motors, being proportional to the on-time of said switching means.

3. The system as described by claim 2, wherein:

each of the controller means is arranged with the other of said controller means to exchange respective motor position, speed and current command and feedback data and to vote on said exchanged data, whereby each of said controller means processes the same of said command and feedback data to mask any fault variables and to provide uniform current commands to the respective motors for inhibiting force-fight between said motors, and for balancing motor load, whereupon failure of a particular motor or its respective channel causes distribution of the motor load among the remaining motors.

4. The system as described by claim 3, including:

means for synchronizing the operation of the plurality of control channels to insure that all of said channels receive identical data so that the uniform current commands can be provided by the respective controller means.

5. The system as described by claim 4, including:

means connected to each of said controller means for applying command signals to said each of said controller means.

6. A fault tolerant system for driving an actuator, comprising:

a plurality of motors coupled to the actuator for driving said actuator; a corresponding plurality of inverters, each of which is connected to a respective motor; a power source connected to each of the plurality of inverters, said inverters distributing power from the power source to the respective motors; a corresponding plurality of controllers with a controller at each motor that receives data and votes on data to control motor operation, each of which is connected to a respective motor and to a respective inverter;

means for applying command signals to each of said controllers at the individual channel level; and each of said controllers being responsive to said command signals for providing data relating to the speed and position of the respective motors and for controlling said respective inverters in accordance therewith, and for providing data relating to the amplitude and direction of the respective motors and for controlling said respective motors in accordance therewith.

7. The system as described by claim 6, including:

means for exchanging data between each of the plurality of controllers to insure that each of the controllers receives identical data for determining respective motor current commands.

8. A fault tolerant actuator driving method comprising:

driving an actuator with a plurality of motors; driving each of the plurality of motors through a controller at each motor that receives data and votes on data at the individual channel level through a respective control channel of a corresponding plurality of control channels;

controlling each of the plurality of control channels for sharing an actuator driving load; and supplying a load driving force so that each of the channels supplies 1/n of the load driving force in the same direction.

9. The method as described by claim 8 including:

rendering a corresponding plurality of switching means on and off for blocking and passing current to respective motors of the plurality of motors and;

the respective motors delivering torque in proportion to the on-time of the switching means.

10. The method as described by claim 9, including:

exchanging respective motor position speed and current command and feedback data between each of the control channels; and voting on the exchanged data, to insure processing of the same of said command and feedback data by each of said control channels.

11. The method as described by claim 10, wherein processing the same of said command and feedback data includes:

inhibiting force—fight between said plurality of motors; and balancing motor load, whereupon failure of a particular motor or its respective channel insures distributing the motor load among the remaining motors.

12. The method as described by claim 10, including:

Synchronizing the operation of the plurality of control channels for insuring that all of said channels receives identical data.

* * * * *